3,644,352
N-α-AMINO ACYLAMIDO PYRROLES
Richard Rips, Paris, France, assignor to Centre National de la Recherche Scientifique and Institut National de la Sante et de la Recherche Medical, both of Paris, France
No Drawing. Filed Dec. 4, 1968, Ser. No. 781,241
Claims priority, application France, Nov. 20, 1968, 176,071
Int. Cl. C07d 27/26
U.S. Cl. 260—247.2 A          5 Claims

ABSTRACT OF THE DISCLOSURE

N-α-amino acylamido pyrroles of the formula:

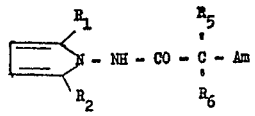

in which
$R_1$ and $R_2$ are each cyclic or acyclic hydrocarbon radicals
Am is a cyclic or acyclic secondary amine radical linked by its nitrogen atom to the α-carbon atom of the acyl group,
$R_5$ and $R_6$ are each hydrogen or methyl,
and their salts are useful in treating disorders of the central nervous system, the cardiovascular system and the endocrine system.

---

This invention relates to amide compounds of the pyrrole series. According to the present invention there are provided α-amino acylamido pyrroles of the general Formula I:

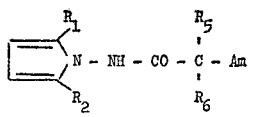

(I)

wherein each of the symbols $R_1$ and $R_2$ represents an acyclic or cyclic hydrocarbon radical, Am represents a radical of a cyclic or acyclic secondary amine linked by its nitrogen atom to the α-carbon atom of the acyl group, and $R_5$ and $R_6$ are the same or different and are hydrogen atoms or methyl groups, and the acid addition salts of such compounds.

The symbols $R_1$ and $R_2$ preferably represent hydrocarbon groups of 1 to 6 carbon atoms and the symbol Am preferably represents the residue

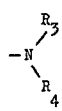

in which each of the symbols $R_3$ and $R_4$ represents an acyclic or cyclic hydrocarbon having 1–6 carbon atoms, or represents a cyclamine which, in its ring, may include one or more other hetero atoms, for example pyrrolidine, piperidine, piperazine or morpholine. Preferred acid addition salts are the hydrochlorides.

More particularly according to the invention there was provided compounds of the Formula II:

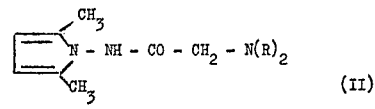

(II)

wherein R represents a straight or branched chain alkyl radical having 1 to 6 carbon atoms, an alkyl radical or a cyclohexyl radical, and the acid addition salts thereof, especially their hydrochlorides.

According to a further feature of the invention there is provided a process for the production of a compound according to Formula I which comprises condensing a hydrozide of a compound of the Formula III:

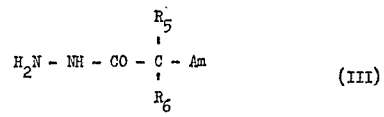

(III)

with a diketone compound corresponding to the Formula IV:

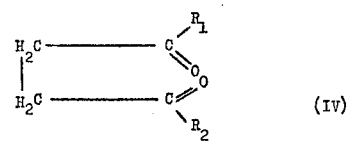

(IV)

the symbols having the meanings indicated above.

Suitable starting materials are the dialkylamino acethydrazides obtainable as described by R. Rips, C. Derappe and P. Magnin, Journal of Medicinal Chemistry, 8, 529 (1965).

The following examples will serve to illustrate the invention.

EXAMPLE 1

1-dimethylamino acetamido-2,5-dimethyl pyrrolo (R. 515) Am equimolecular mixture of acetonyl acetone (11.5 g., i.e. 0.1 mole) and dimethylamino acethydrazide (11.7 g., i.e., 0.1 mole) is heated to gentle boiling in a distillation flask. After a few moments, elimination of water vapour is observed, and after about an hour the water produced by the condensation has entirely distilled. The mixture is then placed under vacuum, separated and the 1 - dimethylamino acetamido-2,5-dimethyl pyrrole formed is distilled. The yield is of the order of 90%.

The liquid boils at 126–128° (under 14 mm. of mercury;) it solidifies rapidly en masse; after recrystallisation in heptane it is obtained as colourless flakes melting at 123° C.

Analysis for $C_{10}H_{17}N_3O$.—Calculated (percent): C, 61.52; H, 8.76; N, 21.53; O, 8.19. Found (percent): C, 61.64; H, 9.16; N, 21.69; O, 8.49.

EXAMPLES 2 TO 11

In the same fashion as in Example 1, and using various dialkylamino acethydrazides, the compounds identified in Table I and corresponding to Formula II are obtained.

TABLE I

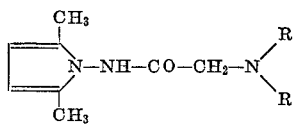

| Example No. | Code No. | R= | Yield, percent | Boiling point/ mm. Hg | M.P. (° C.) | Solvent |
|---|---|---|---|---|---|---|
| 2 | R.265 | Ethyl | 76 | 202–202°/13 | 129 | Pentane. |
| 3 | R.430 | n-Propyl | 53 | 218–219°/2 | 117 | Do. |
| 4 | R.429 | Iso-propyl | 90 | 219°/17 | 207 | Heptane. |
| 5 | R.459 | n-Butyl | 85 | 171°/0.5 | 65 | (¹). |
| 6 | R.451 | Iso-butyl | 93 | 158°/0.4 | 121 | Ethanol. |
| 7 | R.453 | n-Pentyl | 85 | 236°/14 | 40 | (¹). |
| 8 | R.464 | Iso-pentyl | 84 | 232°/13 | 87 | Ethano |
| 9 | R.469 | n-Hexyl | 90 | 206–208°/0.7 | 80 | Do. |
| 10 | R.465 | Cyclohexyl | 68 | 240–245°/0.5 | 203 | Octane. |
| 11 | R.460 | Allyl | 82 | 168°/0.4 | 112 | Hexane. |

¹ Melting region.

TABLE IA

| Example No. | Calculated | | | | Found | | | |
|---|---|---|---|---|---|---|---|---|
| | C | H | N | O | C | H | O | N |
| 2 | 64.56 | 9.45 | 18.82 | 7.16 | 64.51 | 9.41 | 7.13 | 19.02 |
| 3 | 66.68 | 10.02 | 16.72 | 6.36 | 67.00 | 10.03 | 6.35 | 16.68 |
| 4 | 66.68 | 10.02 | 16.72 | 6.36 | 66.87 | 9.89 | 6.54 | 16.91 |
| 5 | 68.77 | 10.46 | 15.03 | 5.73 | 68.77 | 10.54 | 5.87 | 15.42 |
| 6 | 68.78 | 10.46 | 15.03 | 5.73 | 68.64 | 10.14 | 5.56 | 15.26 |
| 7 | 70.30 | 10.81 | 13.66 | 5.20 | 70.14 | 10.78 | 5.60 | 13.95 |
| 8 | 70.30 | 10.81 | 13.66 | 5.20 | 70.35 | 10.70 | 5.72 | 14.28 |
| 9 | 71.58 | 11.12 | 12.53 | 4.77 | 71.43 | 11.22 | 5.08 | 12.54 |
| 10 | 72.46 | 10.03 | 12.68 | 4.83 | 72.67 | 9.57 | 4.83 | 12.80 |
| 11 | 67.98 | 8.55 | 16.99 | 6.46 | 68.17 | 8.71 | 6.60 | 17.03 |

The hydrochlorides of compounds R 265, R 430, R 429 and R 451 melt at 150°, 137°, 247° and 158° respectively.

EXAMPLES 12 TO 22

Other compositions, prepared also according to the directions given in Example 1, are identified hereafter in Table II, by the significance of symbols $R_1$, $R_2$, $R_5$, $R_6$ and Am.

TABLE II

| Example No. | Code No. | $R_1$ | $R_2$ | $R_5$ | $R_6$ | Am | Yield, percent | M.P., °C. | Solvent |
|---|---|---|---|---|---|---|---|---|---|
| 12 | R.937 | $CH_3$ | $CH_3$ | H | H | N⟨⟩ | 82 | 177 | Methanol. |
| 13 | R.938 | $CH_3$ | $C_6H_5$ | H | H | Same | 76 | 131 | Cyclohexane. |
| 14 | R.944 | $CH_3$ | $C_6H_5$ | H | H | $N(n-C_3H_7)_2$ | 71 | 95 | Hexane. |
| 15 | R.946 | $CH_3$ | $C_6H_5$ | H | H | $N(i-C_3H_7)_2$ | 61 | 166 | Cyclohexane. |
| 16 | R.971 | $CH_3$ | $CH_3$ | H | H | $N(CH_3)_2$ | 83 | 112 | Hexane. |
| 17 | R.975 | $CH_3$ | $C_6H_5$ | H | $CH_3$ | Same | 74 | 113 | Cyclohexane. |
| 18 | R.945 | $CH_3$ | $CH_3$ | H | $CH_3$ | $N(C_2H_5)_2$ | 83 | 62 | Pentane. |
| 19 | R.962 | $CH_3$ | $C_6H_5$ | H | $CH_3$ | Same | 75 | 76 | Heptane. |
| 20 | R.986 | $CH_3$ | $CH_3$ | $CH_3$ | $CH_3$ | do | 88 | 158 | Hexane. |
| 21 | R.959 | $CH_3$ | $CH_3$ | H | H | N⟨⟩–i–$C_3H_7$ | 57 | 186 | Cyclohexane. |
| 22 | R.960 | $CH_3$ | $C_6H_5$ | H | H | Same | 54 | 148 | Dilute ethanol. |

The results of the analysis of these 11 compounds were as follows:

TABLE III

| Example No. | Calculated | | | | Found | | | |
|---|---|---|---|---|---|---|---|---|
| | C | H | N | O | C | H | O | N |
| 12 | 66.36 | 8.98 | 17.86 | 6.80 | 66.10 | 8.85 | 17.85 | 6.83 |
| 13 | 73.20 | 7.16 | 14.22 | 5.42 | 72.91 | 7.30 | 14.37 | 5.58 |
| 14 | 73.86 | 9.15 | 12.30 | 4.69 | 73.79 | 9.30 | 12.29 | 4.99 |
| 15 | 72.81 | 8.68 | 13.41 | 5.10 | 72.63 | 8.56 | 13.58 | 4.99 |
| 16 | 63.13 | 9.15 | 20.08 | 7.64 | 62.83 | 9.25 | 20.05 | 7.71 |
| 17 | 70.82 | 7.80 | 15.49 | 5.90 | 70.78 | 8.02 | 15.51 | 5.96 |
| 18 | 65.79 | 9.77 | 17.60 | 6.74 | 65.64 | 9.92 | 17.94 | 6.72 |
| 19 | 72.21 | 8.42 | 14.03 | 5.34 | 72.30 | 8.54 | 14.17 | 5.49 |
| 20 | 66.89 | 10.02 | 16.72 | 6.36 | 66.82 | 10.02 | 16.74 | 6.24 |
| 21 | 70.06 | 10.03 | 14.42 | 5.49 | 70.07 | 10.12 | 14.41 | 5.43 |
| 22 | 74.75 | 8.84 | 11.89 | 4.52 | 75.00 | 8.96 | 11.76 | 4.52 |

The corresponding hydrochlorides may be obtained by dissolving the amino acyl amido pyrrole in anhydrous diethyl ether, and adding to it a solution in anhydrous diethylether of hydrogen chloride gas. The hydrochloride which precipitates is dried, washed with anhydrous diethylether, dried and finally recrystallised.

The compounds of the invention can be used as medicaments in complaints of the central nervous system, the cardiovascular system or the endocrine system.

In pharmacological tests, the results of which are indicated below, the compounds are used in suspension or in aqueous acid solution the pH controlled to be physiologically acceptable level.

The compounds of the foregoing examples are of low toxicity, the $LD_{50}$ being, in the mouse, by intravenous administration from 25–100 mg./kg. and by subcutaneous administration from 500–1500 mg./kg.

Referring to some of the coded compounds:

R.265 used intraperitoneally is a depressive from 10 mg./kg. as determined by tests of observation of behaviour (turning rod and apertured board).

R.430 showed itself to be ganglioplegic by trial on a dog put to sleep with pentobarbital at a dosage of 30 mg./kg. (subcutaneously).

R.429 shows the same depressive actions as R.265 after the same tests and at the same dosage. In dogs, it provokes, at a dose of 10 mg./kg. (subcutaneous), transitory hypotension of 20 mm. mercury. The peripheral vasodilation in rabbits was measured by the galvanometric deflection of a ray reflected from the vessel of the ear. At a dose of 1 mg./kg. (intravenous) an average deflection of 20 units lasting for two minutes was obtained while, under the same conditions, acetylcholine gave an average deflection of 20 units lasting for one minute.

The action of R.459 on barbiturate-induced sleep is as follows: rats are injected intraperitoneally at 40 mg./kg. with mebubarbital and then subcutaneously at a dosage of 10 mg./kg. with the pyrole derivative under test. The control animals wake up after 2 hours 8 minutes and have regained their feet after 2 hours 34 minutes, while the treated animals are wakening at 1 hour 3 minutes and find their feet at 1 hour 11 minutes. This compound is analgesic in mice (heated plate test of Lespagnol-Mercier). At 1 mg./kg. there is observed, half an hour after injection an increase of 62% in the time elapsed before the avoiding reflex.

R.451 is a depressive as determined by behaviour tests on mice. In dogs it provokes at a dose of 30 mg./kg. (subcutaneous), a hypotension of 15 mm. Hg with a rapid return to normal.

R.464 has an antiinflammatory action like that produced by cortisone in double dosage, using the test of inflammation by Kaolin. The results of pharmacological tests for 8 of the 11 compounds are given in the following table:

TABLE IV

| Example No. | Code No. | Turning rod | Traction | Barbituric potential | Analgesic activity | Anti-convulsive activity |
|---|---|---|---|---|---|---|
| 12 | R.937 | X | X | XX | X | X |
| 13 | R.938 | XX | X | XXX | X | 0 |
| 14 | R.944 | X | 0 | XXX | 0 | X |
| 15 | R.946 | XX | X | XXXX | XX | 0 |
| 18 | R.945 | X | 0 | XX | 0 | 0 |
| 19 | R.962 | 0 | 0 | XX | 0 | 0 |
| 21 | R.959 | X | X | XXX | X | X |
| 22 | R.960 | XX | X | 0 | X | 0 |

NOTE.—X=weak activity; XX=medium activity; XXX=strong activity; XXXX=exceptional activity.

Finally, the LD$_{50}$ of these 11 compounds is of the same order as that noted above. With reference to spasmolytic and antihistaminic activity, these compounds show only medium activity.

The new compounds of the present invention and their pharmaceutically acceptable acid addition salts can be administered to man and to animals by oral, parenteral or rectal administration. The active ingredient may be associated with a suitable liquid, solid or semi-solid carrier or excipient as diluent. The pharmaceutical preparations can be presented in solid form, for example in tablets, dragees, suppositories or capsules, or in liquid form, for example as solutions, suspensions or emulsions. For example, the new compounds can be administered in tablets or capsules each containing 50 mg., and the dosage rate can be from 50 to 300 mg. per day.

I claim as my invention:

1. A compound selected from the class of N-α-aminoacylamido pyrroles of the formula

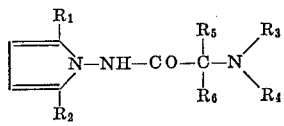

where $R_1$ and $R_2$ are selected from the group consisting of methyl and phenyl, $R_3$ and $R_4$ taken separately are selected from the group consisting of alkyl of 1 to 6 carbon atoms, cyclohexyl and allyl and taken together with the N-atom to which they are linked represent a radical selected from the group consisting of pyrrolidine, piperidine and morpholine, and $R_5$ and $R_6$ are selected from the group consisting of hydrogen atoms and methyl groups, and acid addition salts thereof having pharmaceutically acceptable anions.

2. A pyrrole derivative according to claim 1 which is a hydrochloride.

3. A pyrrole derivative according to claim 1 wherein $R_1$ is selected from the group consisting of methyl and phenyl, $R_2$ is methyl, $R_5$ is selected from the group consisting of hydrogen and methyl and $R_6$ is selected from the group consisting of hydrogen and methyl.

4. A pyrrole derivative of the formula:

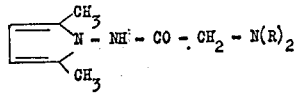

where the R groups are each selected from the class consisting of straight and branched chain alkyl groups containing up to 6 carbon atoms, allyl and cyclohexyl.

5. A pyrrole derivative according to claim 4 which is a hydrochloride.

References Cited

Kameyama et al., C. A. 69: 106704x.

HENRY R. JILES, Primary Examiner

G. T. TODD, Assistant Examiner

U.S. Cl. X.R.

260—268 H, 294 A, 326.3; 424—248, 250, 267, 274

UNITED STATES PATENT OFFICE
CERTIFICATE OF CORRECTION

Patent No. 3,644,352      Dated February 22, 1972

Inventor(s) RICHARD RIPS

It is certified that error appears in the above-identified patent and that said Letters Patent are hereby corrected as shown below:

COL. 1, Lines 8 and 9, change "November 20, 1968, 176,071" to --December 6, 1967, No. 131,223, Application France, November 29, 1968, No. 176,071--.

Signed and sealed this 5th day of September 1972.

(SEAL)
Attest:

EDWARD M. FLETCHER, JR.
Attesting Officer

ROBERT GOTTSCHALK
Commissioner of Patents